Patented June 25, 1935

2,005,848

UNITED STATES PATENT OFFICE 2,005,848

WATER INSOLUBLE AZO DYESTUFF CONTAINING A BENZANTHRONE NUCLEUS

Gerhard Schrader, Opladen, near Cologne-on-the-Rhine, Germany, assignor to General Aniline Works, Inc., New York, N. Y., a corporation of Delaware No Drawing. Application March 25, 1933, Serial No. 662,828. In Germany April 2, 1932

14 Claims. (Cl. 260—86)

The present invention relates to water insoluble dyestuffs and to fibres dyed with the said dyestuffs, more particularly it relates to dyestuffs which may be represented by the probable general formula:

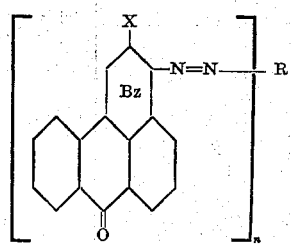

wherein X stands for hydrogen or an alkoxy group, R stands for the radical of a coupling component suitable for producing azodyestuffs, said coupling component being free from groups inducing solubility in water, and $n$ stands for the numbers 1 or 2.

As coupling components suitable for performing my invention there may be enumerated by way of example naphthols, 2-hydroxynaphthoic acid arylamides, hydroxy - anthracene - o - carboxylic acid arylamides, hydroxy-carbazole-o-carboxylic acid arylamides, hydroxy-benzocarbazole-o-carboxylic acid arylamides, acetoacetic arylamides, 1-phenyl -3- methyl -5- pyrazolone, methylketol, and the like.

My new dyestuffs are obtainable by diazotizing Bz-1-aminobenzanthrone or a 2-alkoxy-substitution product and coupling in substance, on a substratum or on the fibre with a coupling component of the kind referred to above. The shades obtained depend upon the specific coupling components used; those produced on the fibre according to the known method of preparing ice colors are distinguished by good fastness to chlorine and boiling.

The invention is illustrated by the following examples, without being limited thereto:

*Example 1.*—50 grams of cotton yarn are impregnated for about half an hour at 30° C. in one litre of a solution prepared from 2 grams 1-(2'.3'- hydroxynaphthoylamino) - 3 - nitrobenzene in the usual manner with the aid of caustic alkali. The well squeezed yarn is then introduced for about half an hour into a diazo solution prepared from 2,45 grams of Bz-1-aminobenzanthrone, in which solution the mineral acid has been neutralized by the addition of sodium acetate. The yarn is rinsed, soaped in a boiling bath, rinsed again and dried. A bluish-blackish violet of good fastness properties is thus obtained.

The dyestuff corresponds to the following formula:

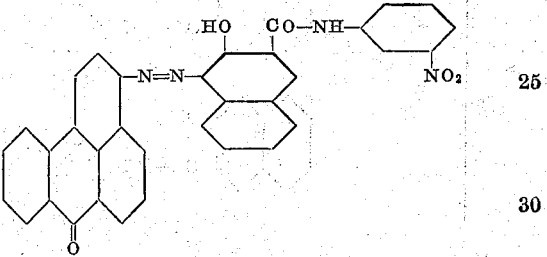

In the following table there are given some combinations and the shades obtained thereby when prepared on cellulosic fibres according to the directions given above:

| | Coupling component | Diazotization component | Shade |
|---|---|---|---|
| 1 | ⟨naphthol⟩-OH, -CO-NH-⟨benzene⟩ | ⟨benzanthrone⟩-NH₂ | Dull bluish-violet |
| 2 | ⟨naphthol⟩-OH, -CO-NH-⟨naphthalene⟩ | ....do.................... | Bluish-blackish-violet |

| | Coupling component | Diazotization component | Shade |
|---|---|---|---|
| 3 | 2-hydroxycarbazole-3-carboxylic acid 4-chloroanilide | 3-amino-benzanthrone | Corinth |
| 4 | 2-hydroxycarbazole-3-carboxylic acid 4-methoxyanilide | do | Greenish black |
| 5 | 2-hydroxyanthracene-3-carboxylic acid 2-methylanilide | do | Greenish grey |
| 6 | bis-acetoacetyl-o-tolidide [CH₃-CO-CH₂-CO-HN-C₆H₃(CH₃)-]₂ | do | Brick red |
| 7 | 3-hydroxynaphthalene-2-carboxylic acid anilide | 3-amino-2-methoxy-benzanthrone | Blue |
| 8 | 3-hydroxynaphthalene-2-carboxylic acid 2-methylanilide | do | Reddish blue |
| 9 | 3-hydroxynaphthalene-2-carboxylic acid naphthylamide | do | Dull blue |
| 10 | 2-hydroxycarbazole-3-carboxylic acid 4-chloroanilide | do | Dull violet |
| 11 | 2-hydroxycarbazole-3-carboxylic acid 2-methyl-4-methoxyanilide | do | Grey |
| 12 | 2-hydroxyanthracene-3-carboxylic acid 2-methylanilide | do | Yellowish green |
| 13 | bis-acetoacetyl-o-tolidide [CH₃-CO-CH₂-CO-HN-C₆H₃(CH₃)-]₂ | do | Dull red |

| Coupling component | Diazotization component | Shade |
|---|---|---|
| 14 ![naphthol-OH-CO-NH-Cl,OCH3,OCH3] | ![OCH3-NH2 benzanthrone] | Navy blue |
| 15 ![naphthol-OH-CO-NH-OCH3,CH3] | do | Clear reddish blue |
| 16 ![naphthol-OH-CO-NH-phenyl] | ![OC2H5-NH2 benzanthrone] | Blue |
| 17 ![naphthol-OH-CO-NH-CH3] | do | Reddish blue |

*Example 2.*—3,13 grams of 2-hydroxy-3-naphthoyl-β-naphthyl-amide are dissolved in 300 ccs. of hot water with the aid of 10 ccs. of aqueous caustic soda lye of 38° Bé. strength. To this solution sodium bicarbonate is added until the solution no longer reacts alkaline to caustic soda. The coupling component thereby partially separates in form of fine flakes. While thoroughly stirring a solution of 2.75 grams of diazotized Bz-1-amino-2-methoxybenzanthrone is added at room temperature, and stirring is continued until coupling is complete. The dyestuff formed is filtered, washed with water and dried. It is a bluish-black, metallic, lustrous powder.

I claim:

1. Water insoluble dyestuffs of the general formula:

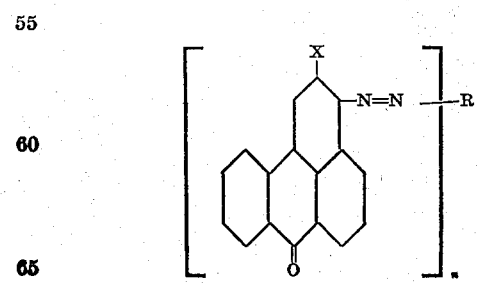

wherein X stands for a hydrogen atom or for an alkoxy group, $n$ stands for one of the numers 1 and 2, and R stands for the radical of an enolic or phenolic coupling component suitable for producing azodyestuffs, yielding, when produced on the fibre, various shades of good fastness to boiling and chlorine.

2. Water insoluble dyestuffs of the general formula:

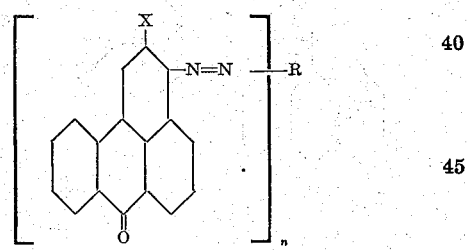

wherein X stands for a hydrogen atom or a methoxy group, $n$ stands for one of the numbers 1 and 2, and R stands for the radical of an enolic or phenolic coupling component suitable for producing azodyestuffs, yielding, when produced on the fibre, various shades of good fastness to boiling and chlorine.

3. Water insoluble dyestuffs of the general formula:

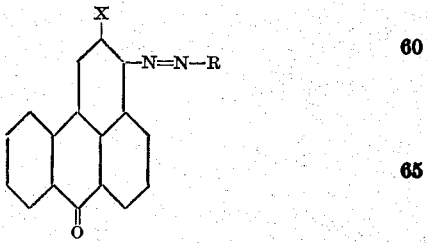

wherein X stands for a hydrogen atom or an alkoxy group, and R stands for the radical of an enolic or phenolic coupling component suitable for producing azodyestuffs, yielding, when produced on the fibre, various shades of good fastness to boiling and chlorine.

4. Water insoluble dyestuffs of the general formula:

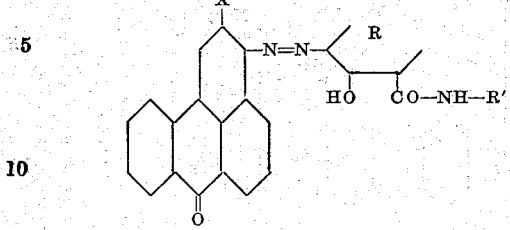

wherein X stands for hydrogen or an alkoxy group, R stands for a naphthalene or anthracene nucleus attached to the azo-bridge in α-position, and R' stands for the radical of the benzene or naphthalene series, yielding, when produced on the fibre, various shades of good fastness to boiling and chlorine.

5. The dyestuff of the following formula:

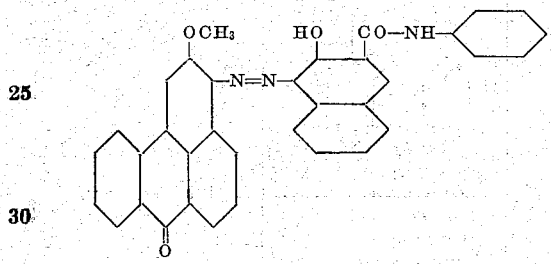

yielding, when produced on the fibre, dull blue shades of good fastness to boiling and chlorine.

6. The dyestuff of the following formula:

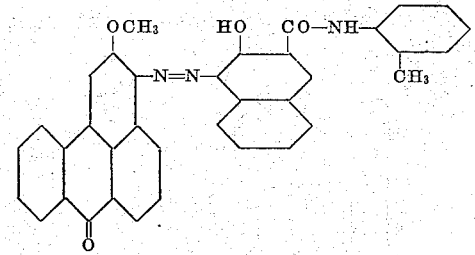

yielding, when produced on the fibre, reddish-blue shades of good fastness to boiling and chlorine.

7. The dyestuff of the following formula:

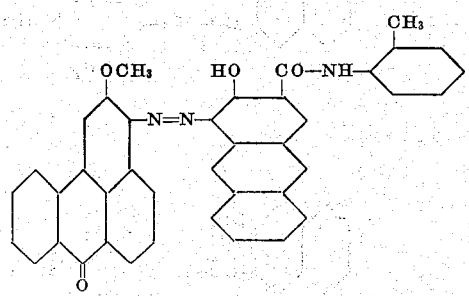

yielding, when produced on the fibre, yellowish green shades of good fastness to boiling and chlorine.

8. Fibre dyed with a dyestuff as claimed in claim 1.
9. Fibre dyed with a dyestuff as claimed in claim 2.
10. Fibre dyed with a dyestuff as claimed in claim 3.
11. Fibre dyed with a dyestuff as claimed in claim 4.
12. Fibre dyed with the dyestuff as claimed in claim 5.
13. Fibre dyed with the dyestuff as claimed in claim 6.
14. Fibre dyed with the dyestuff as claimed in claim 7.

GERHARD SCHRADER.